(12) United States Patent
Chu et al.

(10) Patent No.: US 10,511,472 B2
(45) Date of Patent: Dec. 17, 2019

(54) METHOD OF SIMULTANEOUSLY PERFORMING PACKET DETECTION, SYMBOL TIMING ACQUISITION, AND CARRIER FREQUENCY OFFSET ESTIMATION USING MULTIPLE CORRELATION DETECTION, AND BLUETOOTH APPARATUS USING SAME

(71) Applicant: ABOV Semiconductor co., Ltd., Cheongju-si, Chungcheongbuk-do (KR)

(72) Inventors: Sang Young Chu, Bucheon-si (KR); Ki Tae Moon, Seoul (KR); Suk Kyun Hong, Seoul (KR)

(73) Assignee: ABOV Semiconductor co., Ltd., Cheongju-si, Chungcheongbuk-Do (KR)

( * ) Notice: Subject to any disclaimer, the term of this patent is extended or adjusted under 35 U.S.C. 154(b) by 0 days.

(21) Appl. No.: 16/041,722

(22) Filed: Jul. 20, 2018

(65) Prior Publication Data
US 2019/0028316 A1 Jan. 24, 2019

(30) Foreign Application Priority Data
Jul. 24, 2017 (KR) .................. 10-2017-0093562

(51) Int. Cl.
*H04W 56/00* (2009.01)
*H04L 27/26* (2006.01)
(52) U.S. Cl.
CPC ...... *H04L 27/2663* (2013.01); *H04L 27/2621* (2013.01); *H04L 27/2646* (2013.01); *H04L 27/2656* (2013.01); *H04L 27/2657* (2013.01); *H04L 27/2604* (2013.01); *H04L 27/2637* (2013.01); *H04W 56/001* (2013.01)

(58) Field of Classification Search
USPC .......................................... 375/343; 370/310
See application file for complete search history.

(56) References Cited

U.S. PATENT DOCUMENTS

| | | | |
|---|---|---|---|
| 9,954,701 B2* | 4/2018 | Chu | H04L 27/148 |
| 2009/0285137 A1* | 11/2009 | Fujita | H04L 25/0232 370/310 |
| 2013/0195229 A1* | 8/2013 | Cheng | H04L 27/0014 375/343 |
| 2017/0331652 A1* | 11/2017 | van den Heuvel | H04L 1/206 |
| 2018/0006854 A1* | 1/2018 | Zhang | H04L 27/1566 |
| 2018/0302213 A1* | 10/2018 | Bose | H04L 7/033 |

* cited by examiner

*Primary Examiner* — Eva Y Puente
(74) *Attorney, Agent, or Firm* — PNJ IP Law, P.C.

(57) ABSTRACT

The present invention relates to a method of simultaneously performing packet detection, symbol timing acquisition, and carrier frequency offset estimation in parallel using multiple correlation detection and a Bluetooth apparatus using the same, in which the Bluetooth apparatus receiving a frequency modulated signal includes a frequency demodulating unit converting the received signal into a similar amplitude modulated signal; and multiple correlation detectors generating multiple correlation indices from the converted signal, on a basis of an access address received from a link layer and a plurality of carrier frequency offset search windows. According to the present invention, since packet detection, symbol timing acquisition and carrier frequency offset estimation are simultaneously performed in parallel in the relatively long access address reception interval instead of the short preamble signal reception interval.

14 Claims, 9 Drawing Sheets

FIG. 1

| Preamble | Access Address | PDU N bytes | CRC |
| 8 μs | 32 μs | N*8 μs | 24 μs |

METHOD OF SIMULTANEOUSLY PERFORMING PACKET DETECTION, SYMBOL TIMING ACQUISITION, AND CARRIER FREQUENCY OFFSET ESTIMATION USING MULTIPLE CORRELATION DETECTION, AND BLUETOOTH APPARATUS USING SAME

CROSS REFERENCE TO RELATED APPLICATION

This application claims priority under 35 U.S.C. § 119 to Korean Patent Application No. 10-2017-0093562, filed on Jul. 24, 2017 in the Korean Intellectual Property Office, the disclosure of which is incorporated by reference herein in its entirety.

TECHNICAL FIELD

The present invention relates to a method of simultaneously performing packet detection, symbol timing acquisition, and carrier frequency offset estimation using multiple correlation detection, and a Bluetooth apparatus using the same.

DESCRIPTION OF RELATED ART

Figure 1:
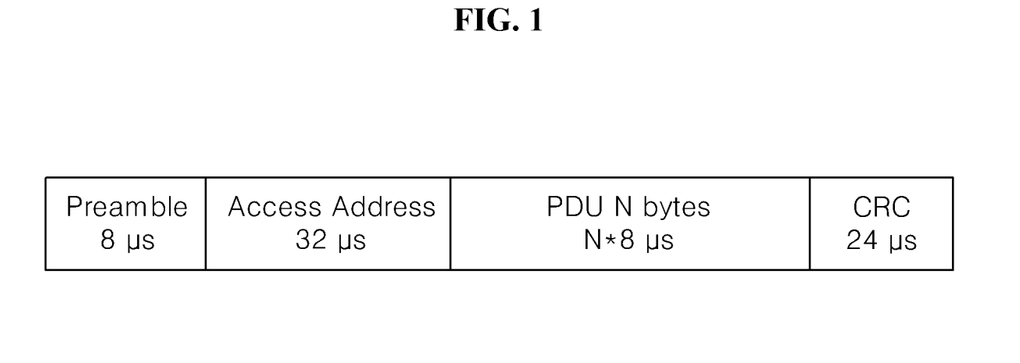
FIG. 1 is a view illustrating a packet structure of a Bluetooth smart signal.
Figure 2:
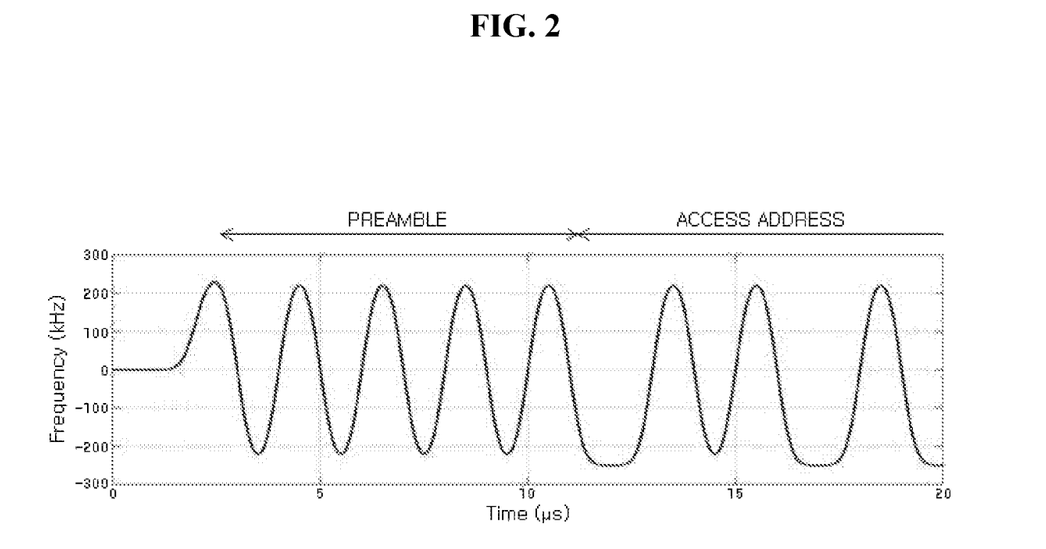
FIG. 2 is a view illustrating a partial waveform of a preamble and an access address after a Bluetooth smart packet signal passes through a frequency demodulator of a receiver in an ideal environment in which a carrier frequency offset does not exist in a strong field system.

A Bluetooth signal uses frequency shift keying (FSK) as a digital modulation scheme for band transmission. The frequency shift keying scheme refers to a method of transmitting digital information consisted of binary number '1b' and '0b' using frequency of an analog carrier, in which the binary number '1b' is converted to a high frequency (a frequency shift in a positive (+) direction), the binary number '0b' is converted to a low frequency (a frequency shift in a negative (−) direction), and they become Gaussian frequency shift keying modulation waveform to which a Gaussian filter is applied, in order to efficiently use the frequency band in the conversion process. A packet of a general Bluetooth Smart or Bluetooth Low Energy (BLE) is configured as shown in FIG. 1 and includes a preamble, an access address, a protocol data unit (PDU), and a CRC interval. As shown in FIG. 2, the Bluetooth transmits a preamble corresponding to a promised pilot between the transmitting and receiving ends, before transmitting the user data associated with the link layer, thereby allowing the preamble to be used for packet detection, symbol timing acquisition, and frequency offset estimation at the receiving end. More specifically, the carrier frequency offset estimation value obtained by using the preamble can be used for signal compensation to remove a deflection component from a user data interval (the access address and the protocol data unit) so as to correspond to the initial carrier frequency offset.

Figure 3:
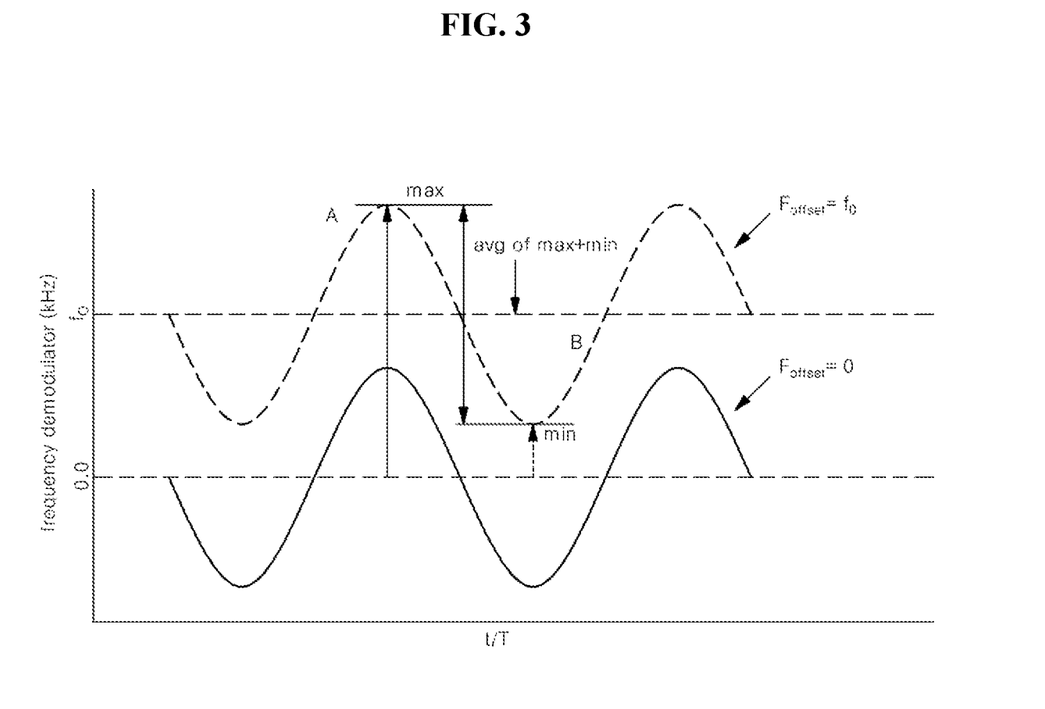
FIG. 3 is a view illustrating a carrier frequency offset estimation method using a waveform passing through a frequency demodulator of a receiver and a 'minimum-maximum average value.

Signals sent by a transmitter are subject to distortions in size and phase during a process that the signals reach a receiver through the channel. In addition, performance may be degraded due to matching characteristics of a low-power analog front-end device including a mixer, a filter, an amplifier, etc. constituting the receiver. Typical examples include non-linearity, IQ mismatch, VCO phase noise, frequency offset, and timing offset. In particular, in the case of a frequency shift keying scheme that transmits digital information through the variation of the frequency, the carrier frequency offset between the transmitting and receiving ends acts as a fatal performance deterioration factor, thereby increasing a probability of discriminating errors of a decider at the receiving end. When the carrier frequency offset occurs, the frequency demodulated output waveform exhibits the state in which the average value of frequency shifts is not zero and is biased by a constant value corresponding to the magnitude of the carrier frequency offset as shown in FIG. 3, thereby increasing the probability of error in sign discrimination at symbol intervals. Since the signal is received in the state in which the quality thereof has been degraded due to signal offset described above, the receiver must be prepared for errorless bit demodulation by implementing a recoverer for corresponding offset with the help of the promised pilot signal.

For a Bluetooth receiver to identify an address during the access address interval and identify and process data during the protocol data unit interval, preparation for the identification of the address and the data must be completed during the preamble interval, in which the preparation includes automatic gain control, frequency offset compensation, timing correction, and the like. As shown in FIGS. 1 and 2, the Bluetooth Smart standard limits the preamble interval to 8 μsec, so that there is a technical limitation in that such a series of processes must be completed in a short time. The preamble is uniquely determined for each standard. In a Bluetooth Smart Core specification version 4.0/4.1/4.2, the binary number '10b' or '01b' has a pattern repeated four times in succession. The frequency offset can be estimated by performing an autocorrelation operation using such a repeated pattern. However, there is a problem that the operation is very complicated.

In order to solve the problem of such complicated calculation, the carrier frequency offset estimation and compensation are performed using an output of a frequency demodulator that converts a frequency modulated (FM) signal into a 'similar amplitude modulated (AM) signal'. As shown in FIG. 2, the frequency demodulated waveform of the preamble has a sine wave-like form in which negative (−) and positive (+) frequency shifts are repeated. FIG. 2 shows a demodulated waveform of a preamble of a baseband that has passed through a frequency demodulator of a receiving end in the absence of an external carrier frequency offset. Since the minimum-maximum frequency shifts have the opposite polarity and the absolute size has the same shape, an average value of the minimum shift and maximum frequency shift is calculated as zero. In contrast, FIG. 3 shows a case in which the carrier frequency offset fo is generated, in which the average value between the minimum and maximum frequency shifts is not zero and is biased by a constant value corresponding to the magnitude of the carrier offset. For example, assuming that the carrier frequency offset fo=+50 kHz, the observed minimum/maximum frequency shifts in a baseband of the receiver are −200 kHz/+300 Hz, which are +50 kHz deflected from the region values of −250 kHz/+250 kHz described in the ideal environment of FIG. 2. The receiver must perform carrier frequency offset compensation in such a manner as to eliminate the bias.

As a method of estimating and compensating a carrier frequency offset using an output of a frequency demodulator that converts a frequency-modulated signal into a similar amplitude modulated signal as described above, U.S. Pat. No. 6,642,797 discloses a technology in which a maximum positive peak and a maximum negative peak are detected during a preamble interval, a carrier frequency offset is calculated using an average value of the maximum positive peak and the maximum negative peak, and an offset normalizer compensates for the offset. However, although the above-described method solves the problem of calculating a complicated autocorrelation, since the method is performed in a short preamble reception interval of only 8 μsec, there is still a problem in that time limitation still limits allowing different estimators of the receiver to use the interval in a divided manner.

SUMMARY OF THE INVENTION

Accordingly, the present invention has been made keeping in mind the above problems occurring in the prior art, and an object of the present invention is to provide a method of simultaneously performing packet detection, symbol timing acquisition, and carrier frequency offset estimation in parallel in a relatively long access address signal reception interval instead of a short preamble signal reception interval and the Bluetooth apparatus using the same.

In addition, another object of the present invention is to provide a method and an apparatus for configuring high-sensitivity receiver that smoothly detects and receives a packet signal even in a region of low signal-to-noise power ratio through cooperation between a physical layer and a link layer.

In order to achieve the object, according to an embodiment of the present invention, there is provided a Bluetooth apparatus receiving a frequency modulated signal, the apparatus including: a frequency demodulating unit converting the received signal into a similar amplitude modulated signal; and multiple correlation detectors generating multiple correlation indices from the converted signal, on a basis of an access address received from a link layer and a plurality of carrier frequency offset search windows.

The multiple correlation indices may be detected in a reception interval of the access address.

Packet detection, symbol timing acquisition, and carrier frequency offset estimation for the received signal may be simultaneously performed in parallel, on a basis of the generated multiple correlation indices.

The multiple correlation indices may be configured with a plurality of access address correlations generated for each of the search windows.

The apparatus may further include an offset estimator, wherein the offset estimator selects one or more search windows from among the plurality of search windows on a basis of the generated multiple correlation indices, and then estimates a carrier frequency offset of the received signal by interpolating a value of the selected search window.

The apparatus may further include a packet detector determining that packet detection is performed when the generated multiple correlation indices are equal to or greater than a threshold value.

The apparatus may further include a symbol timing acquirer extracting a maximum value of the generated multiple correlation indices and acquiring a timing when the extracted maximum value is generated, as an optimum symbol timing.

The multiple correlation detectors may generate the multiple correlation indices by adding the converted signal to the plurality of carrier frequency offset search windows and then comparing the result with the access address.

In order to achieve the object, according to another embodiment of the present invention, there is provided a method of receiving a Bluetooth signal using multiple correlation detections, the method including: receiving a frequency modulated signal; converting the received signal into a similar amplitude modulated signal; and multiple correlations detection step of generating multiple correlation indices from the converted signal, on a basis of an access address received from a link layer and a plurality of carrier frequency offset search windows.

The multiple correlation indices may be detected in a reception interval of the access address.

Packet detection, symbol timing acquisition, and carrier frequency offset estimation for the received signal may be simultaneously performed in parallel, on a basis of the generated multiple correlation indices.

The multiple correlation indices may be configured with a plurality of access address correlations generated for each of the search windows.

The method may further include estimating one or more search windows from among the plurality of search windows on a basis of the generated multiple correlation indices, and then estimating a carrier frequency offset of the received signal by interpolating a value of the selected search window.

The method may further include determining that packet detection is performed when the generated multiple correlation indices are equal to or greater than a threshold value.

The method may further include a symbol timing acquiring step of extracting a maximum value of the generated multiple correlation indices and acquiring a timing when the extracted maximum value is generated, as an optimum symbol timing.

The multiple correlations detection step may generate the multiple correlation indices by adding the converted signal to the plurality of carrier frequency offset search windows and then comparing the result with the access address.

As described above, according to the present invention, since the packet detection and the symbol timing acquisition as well as the carrier frequency offset estimation are simultaneously performed in parallel in the relatively long access address reception interval instead of the short preamble signal reception interval, so that a series of processes are performed during a longer time compared with the prior art using the preamble interval, the reliability of packet detection and symbol timing acquisition robust to the carrier frequency offset can be secured, and at the same time, accuracy of the carrier frequency offset estimation of the carrier frequency offset can be improved.

Also, there is an effect that it is possible to configure a high-sensitivity receiver that smoothly detects and receives a packet signal even in a region of low signal-to-noise power ratio through cooperation between the physical layer and the link layer.

Since the calculation in the present invention does not use a preamble reception interval, it is possible to further secure available time in other calculation blocks such as automatic gain control, symbol timing estimation, and other offset estimation using the preamble, thereby improving performance of the reception system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF EXEMPLARY EMBODIMENTS

Hereinafter, embodiments of the present invention will be described in detail with reference to the accompanying drawings so that those skilled in the art can easily carry out the present invention. In the following description, only portions necessary for understanding the operation according to the embodiment of the present invention are shown and described, and the description and the other portions of the drawings are omitted so as not to obscure the gist of the present invention. The present invention may, however, be embodied in many different forms and should not be construed as limited to the embodiments set forth herein.

It is also to be understood that the terms and words used in the following description and claims should not be construed as limited to ordinary or dictionary meanings and should be construed as having a meaning and concept consistent with the technical idea of the present invention so as to express the present invention most appropriately.

Throughout the specification, when a part is referred to as being "connected" to another part, it is not limited only to a case where they are "directly connected," but a case where they are "electrically connected" with another part in between. Also, when a portion "includes" a component, it means to include other components, not exclude other components, unless specifically stated otherwise.

For simplicity of explanation, one or more methods are shown and described herein as a series of steps, for example in a form of a flowchart or flowchart, but the invention is not limited by the order of the steps. It is because the present invention may be done in a different order than that shown and described herein in accordance with the present invention or concurrently with other steps. Moreover, not all illustrated steps must be implemented in accordance with the present invention.

In describing various embodiments of the present invention, corresponding elements are denoted by the same names and the same reference numerals. In order to explain the embodiments of the present invention, the sizes of components, the thicknesses of lines, and the like may be exaggerated for convenience of understanding.

The reception sensitivity required for the Bluetooth core specification is only −70 dBm and a signal-to-noise power ratio in the corresponding signal magnitude range is more than 30 dB, so that the noise component is relatively small, and therefore packet detection and mismatch estimation can be achieved very accurately.

This is allowed only in an ideal environment, whereas, in a current situation, a demand for a high-sensitivity receiver supporting a value equal to or lower than −90 dBm is increasing. Therefore, there is an increasing need for a method capable of increasing the accuracy of packet detection, symbol timing acquisition, and carrier frequency offset estimation even in a low signal-to-noise power ratio environment, in order to meet the need of a high-sensitivity receiver of Bluetooth signals. Since the received signal-to-noise power ratio decreases down to 10 dB or less in the signal magnitude range of −90 dBm or less and the correlation characteristic also decreases due to relatively high noise magnitude, automatic gain control, and frequency offset estimation, it is very difficult to accurately perform all the offset correction operations such as the automatic gain control, frequency offset estimation, symbol timing estimation, and the packet detection operation of determining whether there is the packet, in a short preamble interval of only 8 μsec.

In the prior art, carrier frequency offset recovery is generally performed in such a manner to be acquired in the preamble signal interval of a promised pattern in a first acquisition step and to be tracked in the data signal interval in order to cope with noise averaging effect and frequency drift in a second step. The acquisition step uses the 'minimum-maximum average value' scheme in the preamble interval, which is performed by calculating the frequency shift offsets in the negative (−) direction and the positive (+) direction, and therefore it is common that an interval equal to or greater than two symbols of the preamble interval of a total of eight symbols is used for carrier frequency offset estimation.

When the calculation process for the carrier frequency offset estimation may be omitted in the preamble interval, it is possible to allow more time to be allocated to automatic gain adjustment or symbol timing acquisition, thereby improving accuracy of other mismatch estimation, on which the present invention is contemplated According to Korean Patent Application Publication No. 10-2017-0079385, which is an earlier application of the applicant, the packet detection and the symbol timing acquisition may be implemented by calculating correlation between a received signal in an access address and an access address bit stream received from a link layer instead of the preamble. When the correlation exceeds the threshold value, it may be recognized that the packet assigned has been detected. In this case, when the packet is detected, a peak of a correlation of the detected packet is detected thereby acquiring the optimum symbol timing, and thus the symbol timing acquisition information may be shared by all receiving devices of a physical layer. Since the presence of a packet allocated to the receiving device is detected in the physical layer, the physical layer may be operated in a manner to transfer the demodulated protocol data unit information as a valid protocol data unit for the link layer. However, in order for the above method to be operated normally, effective correlation calculation must be secured. For this purpose, a limitation occurred wherein the carrier frequency offset estimation and compensation of the demodulated signal must temporally proceed.

The present invention is to extend and improve the technical concept of the above-mentioned earlier application, in which a carrier frequency offset search window and multiple correlation determiner are used to simultaneously perform the packet detection and the symbol timing acquisition as well as the carrier frequency offset estimation in parallel, so that reliability of the packet detection and the symbol timing acquisition robust to the carrier frequency offset can be ensured, and at the same time accuracy of the carrier frequency offset estimation in the signal intensity region of the reception sensitivity can be improved by the noise averaging effect. By using, for the calculation, an access address interval of 32 μsec instead of the preamble interval of 8 μsec, time available for other mismatch estimation blocks using the preamble interval can be additionally secured, thereby improving performance of the entire system.

Figure 4:
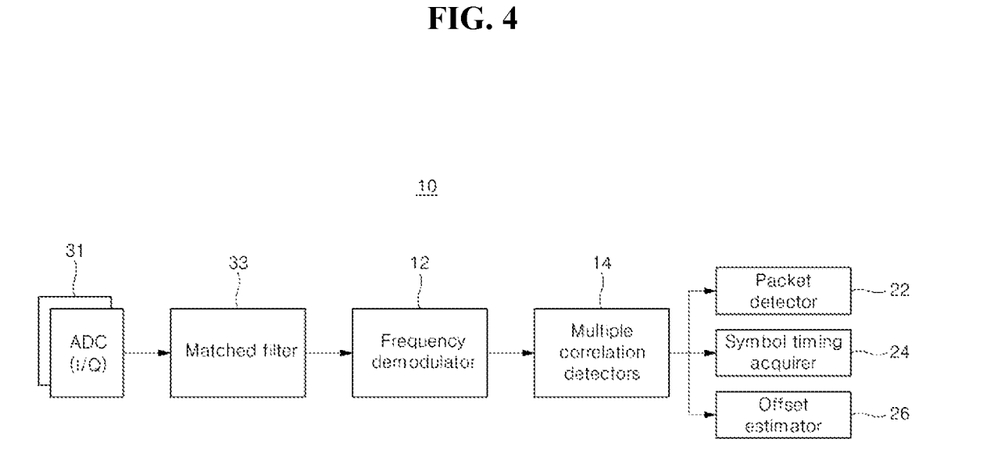
FIG. 4 is a block diagram depicting a configuration of a Bluetooth apparatus according to an embodiment of the present invention.

FIG. 4 is a block diagram depicting a configuration of a Bluetooth apparatus 10 according to an embodiment of the present invention.

Referring to FIG. 4, the Bluetooth apparatus 10 according to the present invention may be configured to include a frequency demodulator 12 and multiple correlation detectors 14. The Bluetooth apparatus 10 according to the present invention may further include a packet detector 22, a symbol timing acquirer 24, or an offset estimator 26. The Bluetooth apparatus 10 may further include blocks such as an ADC 31 and a matched filter 33, but detailed descriptions or illustrations thereof have been omitted to give further descriptions necessary for understanding the operation according to the present invention.

The Bluetooth apparatus 10 is configured to receive an I signal and a Q signal, and convert analog values thereof into digital values via the ADC 31. The output of the ADC 31 is transferred to the frequency demodulator 12 through the matched filter 33.

The frequency demodulator 12 generates a frequency proportional signal (up-sampled signal) having a value proportional to frequency of a baseband signal. That is, it converts a frequency modulated (FM) signal into a similar amplitude modulated (AM) signal.

Figure 5:
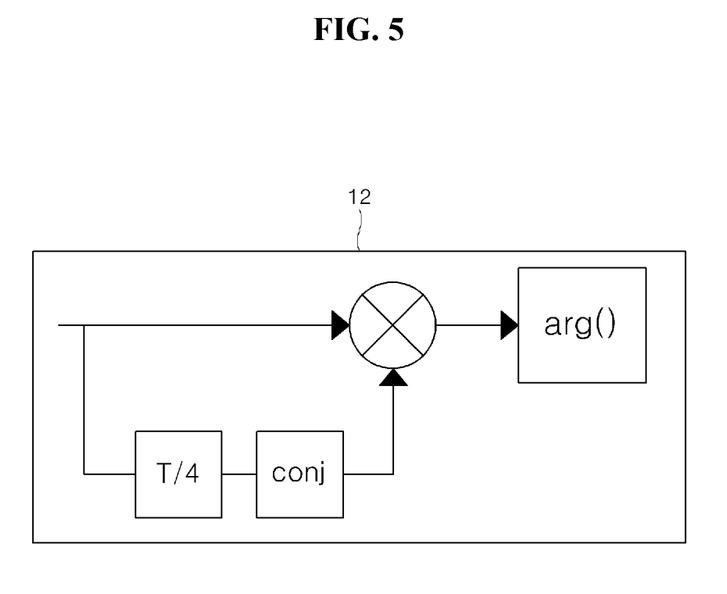
FIG. 5 is a view illustrating a frequency demodulator of a Bluetooth apparatus according to another embodiment of the present invention.

There are various methods of demodulating a frequency modulated signal at a receiving end, in which the frequency demodulator 12 according to an embodiment referring to FIG. 5 is a demodulator of a differential discriminator mechanism.

The ADC 31 operates at a sampling rate (N times) higher than the Nyquist rate, which is defined as twice the symbol rate, so that digital signal demodulation is possible. Specifically, the signal passing through the matched filter 33 consists of N samples per symbol. More specifically, in order to smoothly recover a signal deteriorated due to a noise or a clock error, the ADC 31 operates at an up-sampling time interval smaller than a symbol interval. For example, the symbol interval of the Bluetooth Smart standard is 1 μsec and the Nyquist sampling rate is twice the symbol rate, and therefore the sampling time interval of the analog-to-digital converter may be designed to be less than 0.5 μsec. In FIG. 5, an example operating at 4 samples intervals per symbol is illustrated. A 'conj' block is a conjugate operator, a 'x' block is a multiplier operator, and an 'arg( )' is an angle operator as an argument.

The multiple correlation detectors 14 generate multiple correlation indices from the up-sampled frequency-proportional signal, based on a plurality of carrier frequency offset search windows and the access address received from the link layer. The multiple correlation indices are detected in the reception interval of the access address, and are configured with a plurality of access address correlations generated for each search window. The detailed structure of the multiple correlation detectors 14 will be described with reference to FIG. 6.

The Bluetooth apparatus 10 may simultaneously perform packet detection, symbol timing acquisition, and carrier frequency offset estimation of a received signal in parallel, on a basis of the multiple correlation indices generated in the multiple correlation detectors 14.

The offset estimator 26 may select one or more search windows from among a plurality of search windows, on a basis of the multiple correlation indices generated by the multiple correlation detectors 14. Then, the carrier frequency offset for the received signal may be estimated by interpolating the value of the selected window. This process will be described with reference to FIG. 6.

The packet detector 22 determines that packet detection is performed if the generated multiple correlation indices are equal to or greater than a threshold value. The symbol timing acquirer 24 extracts the maximum value of the multiple correlation indices, and an occurrence timing of the extracted maximum value may be acquired as an optimum symbol timing.

Figure 7:
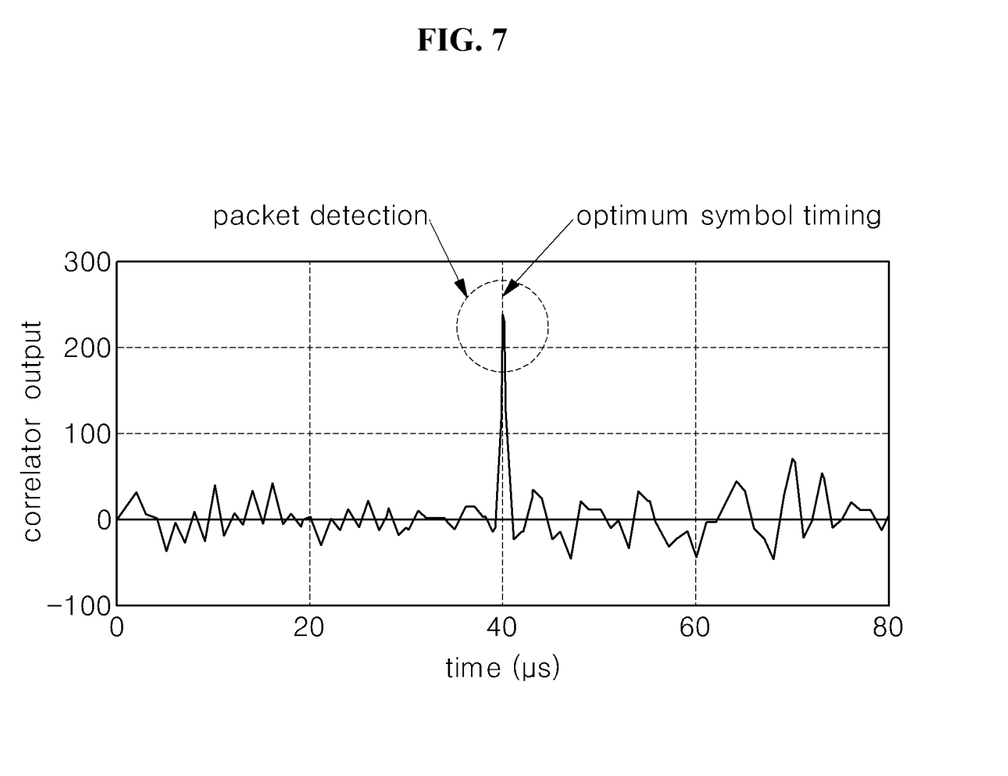
FIG. 7 is a view illustrating waveforms observed at an output end of multiple correlation detectors of a Bluetooth apparatus according to still another embodiment of the present invention.

Referring to FIG. 7, a waveform observed in an output end of the multiple correlation detectors 14 is shown, in order to describe operations of the packet detector 22 and the symbol timing acquirer 24. The output waveform will exhibit a peak value at a point in time when the waveform is coincided with an address bit stream stored in advance from the received signal. Herein, when the output waveform exceeds a threshold value at a specific point in time, the packet detector 22 may recognize that a packet allocated to the Bluetooth apparatus 10 has been received (packet detection).

That is, the output of the multiple correlation detectors 14 is generated by comparing the up-sampled frequency-proportional signal with an access address bit stream received from the link layer, which results in a correlation between the frequency-proportional signal and the access address bit stream. Therefore, it is possible to discriminate whether the up-sampled frequency-proportional signal and the access address bit stream are substantially coincident with each other, and when the multiple correlation indices are equal to or greater than the threshold value, it can be recognized that the packet allocated to the Bluetooth apparatus 10 has been received. Herein, the access address bit stream received from the link layer may be a master-slave link address of the Bluetooth apparatus 10. In addition, the number of the threshold value may be one or more according to the number of search windows, and one or more starting from the greatest correlation may be selected from among multiple correlations, but the present invention is not limited thereto.

Meanwhile, the symbol timing acquirer 24 may track a peak value during the symbol time, and may acquire a timing when a peak value is generated, as an optimum symbol timing. That is, as described above, the signal passing through the matched filter 33 is consisted of N samples per symbol, and it is necessary to acquire an optimum sample phase used for demodulating data bits. When packet detection is performed by the packet detector 22, a timer is operated for one symbol time from that point in time to track the peak position of the correlation output value. When the timer expires, the detected peak position is acquired as the optimum symbol timing phase and then used for demodulating a protocol data unit received. A protocol data unit receiving signal is sampled in the corresponding sampling timing phase at symbol intervals instead of up-sampling time intervals after the acquisition and the output bit stream passing through the bit discriminator is transferred to the link layer.

Since the packet detection and symbol timing acquisition method as described above may be implemented from multiple correlation indices rather than one correlation, that is, a plurality of access address correlations, accuracy of packet detection and symbol timing may be further improved.

Figure 6:
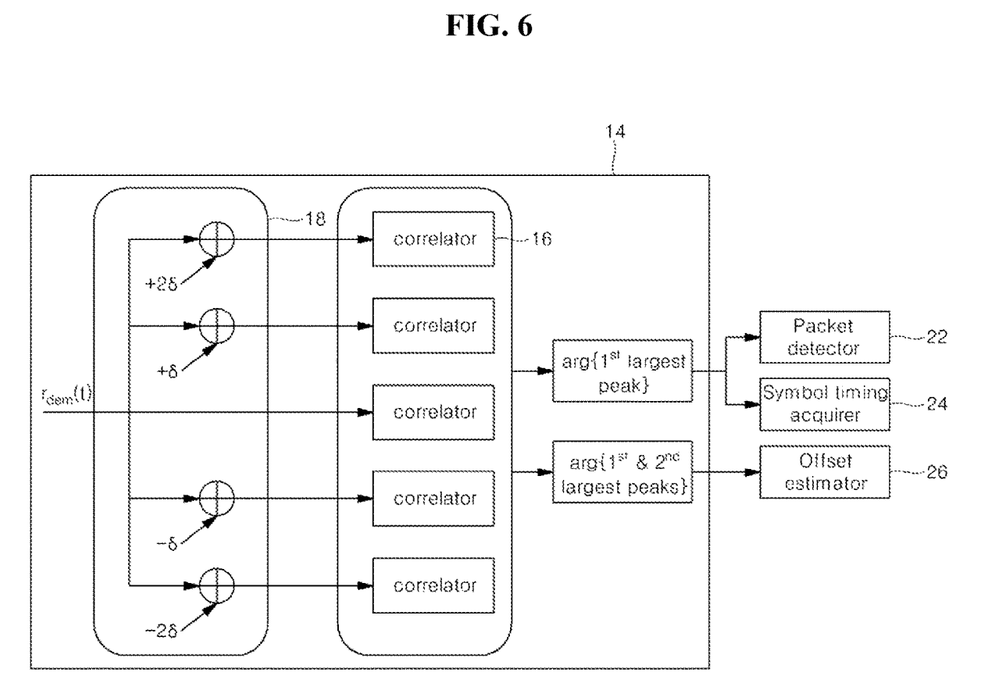
FIG. 6 is a view illustrating multiple correlation detectors of a Bluetooth apparatus according to still another embodiment of the present invention.

FIG. 6 is a view illustrating multiple correlation detectors 14 of a Bluetooth apparatus according to still another embodiment of the present invention Referring to FIG. 6, the multiple correlation detectors 14 according to the present invention may be configured to include a plurality of carrier frequency offset search windows 18 and a plurality of access address correlators 16.

An output rdem of the frequency demodulator 12 passes through a plurality of carrier frequency offset search windows 18. The carrier frequency offset search windows 18 are provided such that the correlation is calculated for a demodulated signal obtained by removing the corresponding carrier frequency offset in advance using the different carrier frequency offset search windows that are set depending on the expected carrier frequency offset magnitude, which is referred to as operation in a posterior decision manner. Therefore, it is advantageous in that it is free from time constraints.

The number and size of carrier frequency offset search windows 18 may be determined according to accuracy of the carrier frequency offset required by the application product family. For example, in a product family such as a remote controller, clock mismatch may be large, so that the search window can be widened to enlarge an acquiring area, whereas in a product group like a smart phone, clock mismatch is not large, so that the search window may be low to increase acquiring performance.

Therefore, values of the carrier frequency offset search windows 18 may have various constants and may be adaptively changed to converge to an actual carrier frequency offset while undergoing repetitive receptions. In the figure, five values of −2δ, −δ, 0, +δ, and +2δ are used as values of the carrier frequency offset search windows 18, but are not necessarily limited thereto.

The calculation of the carrier frequency offset can be performed by selecting a search window having the greatest correlation or by collecting representative search windows having a large correlation and then undergoing statistical processing thereon. Here, the statistical processing may use various techniques such as a simple average, a weighted average, and the like. In the drawing, correction is performed from two values having the greatest correlation (arg{1st & 2nd largest peaks}), but the present invention is not limited thereto. For example, assuming that a carrier frequency offset is 15 kHz and a value of δ is 10, windows of +δ and +2δ with the largest correlation index are selected in the drawing, and (δ+2δ)/2=(10+20)/2=30/2=15 kHz is obtained by performing linear interpolation on the values of the two windows, which results in acquiring 15 kHz value that was originally assumed.

Meanwhile, the multiple correlation detectors 14 includes multiple access address correlators 16 that are implemented by using a plurality of single access address correlators that are independently operated, whereby it is possible to increase accuracy of packet detection and symbol timing acquisition and at the same time to be used for carrier frequency offset estimation. The multiple access address correlators 16 that are independently operated have different carrier frequency offset search windows and are provided to be operated for a demodulated signal obtained by removing the corresponding carrier frequency offset in advance. In the drawing, packet detection and symbol timing acquisition are performed from a value with the highest correlation arg {1st largest peak} among the outputs of the multiple access address correlators 16, but is not necessarily limited thereto.

Figure 8:
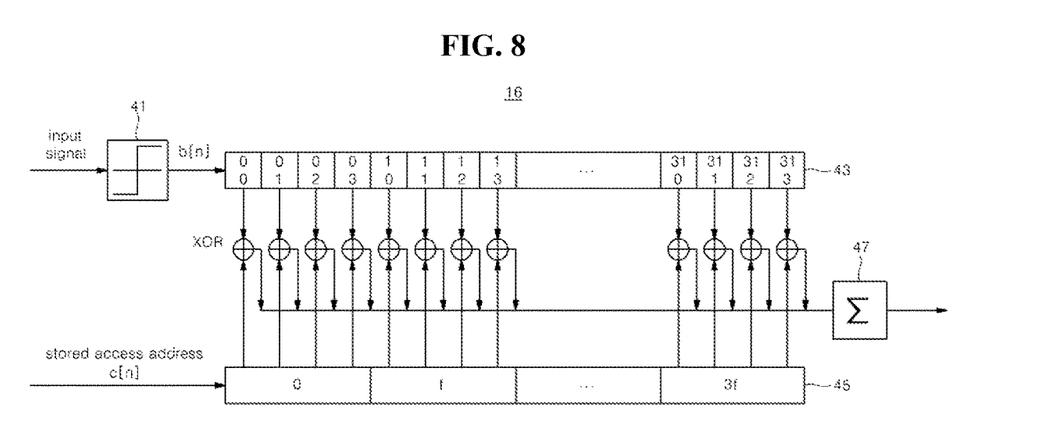
FIG. 8 is a view illustrating an access address correlator of a Bluetooth apparatus according to still another embodiment of the present invention.

FIG. 8 is a view illustrating an access address correlator 16 of a Bluetooth apparatus according to still another embodiment of the present invention Referring to FIG. 8, an embodiment of an access address correlator 16 that makes up the multiple correlation detectors 14 is shown.

In order to overcome disadvantages of high computational complexity and associated metric threshold uncertainty of a typical correlation receiver, a binary correlation receiver as shown may be used. Correlation with a sync word defined by a single bit is replaced by a simple counter and an output of the correlator has a discrete value of $y[n] \in \{-N, \ldots, +N\}$. Since only sign information of the received signal is used, it is possible to omit a process of observing the signal magnitude and use a fixed threshold value THR. A series of processes are shown in Equation 1 below.

$$b[n] = \begin{cases} +1, & \text{if } r[n] \geq 0 \\ -1, & \text{if } r[n] < 0 \end{cases} \quad \text{[Equation 1]}$$

$$y[n] = \sum_{k=0}^{N-1} c[n]b[n+k-(N-1)],$$

$$y[n] \in \{-N, \ldots, +N\}$$

$$\text{pkt\_det} = \begin{cases} 1, & \text{if } y[n] \geq THR \\ 0, & \text{if } y[n] < THR \end{cases}$$

Implementing the equation 1 as an embodiment, the access address correlator 16 includes a sign discriminator 41, a correlation output unit 47, a FIFO register 43, and an address memory 45 as shown in FIG. 8.

The access address correlator 16 operates using the access address bit stream, received from the link layer, as a reference signal. The access address correlator 16 may include the sign discriminator 41 using the sign value of the input received signal in order to reduce the complexity of the implementation and reduce the amount of computation.

The sign discriminator 41 may discriminate the sign of the up-sampled frequency proportional signal to produce b[n]. The series of b[n] bit streams may be sequentially stored in the FIFO register 43. In this case, the access address corresponds to 32 bits and the sign discriminator 41 operates at a 4 sample interval per symbol, and thus the FIFO register 43 may store 32 bits×4 samples=128b[n] bit streams in order to perform valid discrimination. The FIFO register 43 may operate in a First-In First-Out (FIFO) manner. The FIFO register 43 may store a number of identified bits equal to a predetermined number, and may evict the oldest bit when storing a new bit. The predetermined number may be, for example, 128 as shown in FIG. 8.

The address memory 45 may receive an access address c[n] indicative of the Bluetooth apparatus 10 itself from the link layer, and may store the access address. The address memory 45 has a space in which a 32-bit access address may be stored. A logical operation, such as an exclusive OR (XOR) operation may be performed between the b[n] bit streams stored in the FIFO register 43 and the c[n] provided from the address memory 45.

The correlation output unit 47 may generate a correlation output by performing logical operations on b[n] and c[n] and summing the results. The comparison between the up-sampled b[n] and c[n] enables the comparison between the received signal and previously stored address bit streams in a state that a symbol timing s not been accurately obtained.

The access address correlator 16 as described above may reduce the complexity of implementation and reduce the amount of computation, and the implementation of the access address correlator 16 is not limited to this embodiment and may be implemented in various ways.

Figure 9:
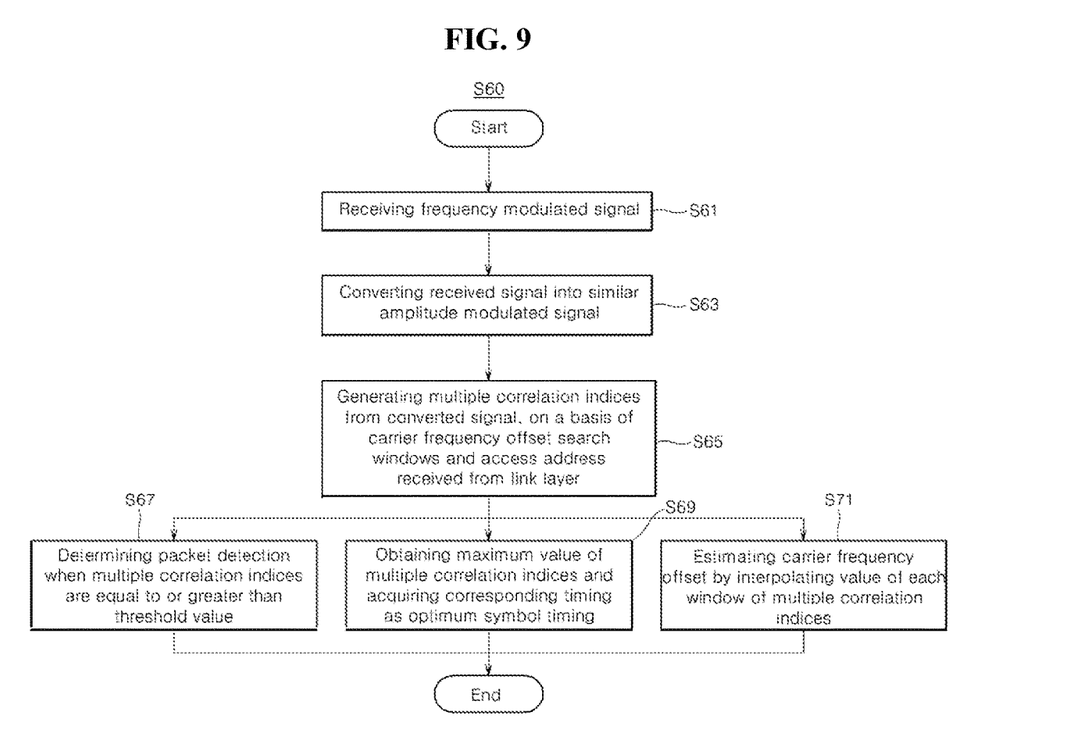
FIG. 9 is a flowchart illustrating a specific example of a Bluetooth signal receiving method according to a preferred embodiment of the present invention.

FIG. 9 is a flowchart showing a specific example of a Bluetooth signal receiving method S60 according to a preferred embodiment of the present invention.

Referring to FIG. 9, in step S61, a Bluetooth apparatus 10 may receive a Bluetooth signal. The received Bluetooth signal is a frequency modulated (FM) signal at a transmitting end.

In step S63, the Bluetooth apparatus 10 may convert the signal received in step S61 into a similar amplitude modulated (AM) signal. In this process, the process described in FIG. 4 may be performed.

In step S65, multiple correlation indices may be generated from the converted signal, on a basis of a plurality of carrier frequency offset search windows and an access address received from a link layer. That is, the multiple correlation indices may be generated by adding the converted signal to the carrier frequency offset search windows 18 and then comparing the result with the access address. This step may be performed by the multiple correlation detectors 14 of FIG. 6. Furthermore, multiple correlation indices may be performed in the access address reception interval. Also, the multiple correlation indices may be configured with a plurality of access address correlations generated for each of the search windows.

The Bluetooth apparatus 10 may simultaneously perform packet detection, symbol timing acquisition, and carrier frequency offset estimation for the received signal in parallel, on a basis of the multiple correlation indices generated in step S65.

Step S67 is a packet detection step, in which packet detection is determined when the multiple correlation indices generated in step S65 are equal to or greater than a threshold value.

In step S69, the maximum value of the multiple correlation indices generated in step S65 may be obtained and the corresponding timing may be acquired as an optimum symbol timing.

In step S71, the carrier frequency offset may be estimated by interpolating a value of each window of the multiple correlation indices generated in step S65. That is, one or more search windows may be selected from among the plurality of search windows, on a basis of the generated multiple correlation indices, and then the carrier frequency offset for the received signal may be estimated by interpolating the selected window value.

Steps S67, S69, and S71 may be performed simultaneously in parallel.

As described above, according to the present embodiments, the packet detection, the symbol timing acquisition, and the carrier frequency offset estimation calculation are simultaneously performed in parallel at the access address interval of 32 μsec instead of the preamble interval of 8 μsec, using the carrier frequency offset search windows and the multiple correlation detectors, whereby the reliability of packet detection and symbol timing acquisition robust to the carrier frequency offset is ensured and at the same time the accuracy of carrier frequency offset estimation in the signal intensity region of the reception sensitivity is enhanced by the noise averaging effect. In addition, by using the access address interval instead of the preamble interval for the calculation, it is possible to additionally secure available time of other mismatch estimation blocks using the preamble interval, thereby improving the overall performance.

Further, by using a received signal in the access address instead of a received signal in the preamble for carrier frequency offset estimation, the calculation time of the correlation increases from approximately 2 μsec of an average of two symbols of the preamble to 32 μsec corresponding to the entire length of the access address so that the noise magnitude is reduced to 1/16 times or less due to an averaging effect, and thus the packet detection performance may be improved to be 12 dB.

While the present invention has been described with reference to exemplary embodiments, it is to be understood that the invention is not limited to the disclosed embodiments, but, on the contrary, is intended to cover various modifications and equivalent arrangements included within the spirit and scope of the appended claims. Accordingly, the true scope of the present invention should be determined by the technical idea of the appended claims.

The invention claimed is:

1. A Bluetooth apparatus, the apparatus comprising:
   a frequency demodulating unit receiving a frequency modulated signal and converting the frequency modulated signal into a similar amplitude modulated signal which is a frequency proportional signal having a value proportional to frequency of a baseband signal; and
   multiple correlation detectors generating multiple correlation indices from the similar amplitude modulated signal, on a basis of an access address received from a link layer and a plurality of carrier frequency offset search windows,
   wherein a packet detection, a symbol timing acquisition, and a carrier frequency offset estimation for the frequency modulated signal are simultaneously performed in parallel, on a basis of the multiple correlation indices.

2. The apparatus according to claim 1, wherein the multiple correlation indices are detected in a reception interval of the access address.

3. The apparatus according to claim 1, wherein the multiple correlation indices are configured with a plurality of access address correlations generated for each of the plurality of carrier frequency offset search windows.

4. The apparatus according to claim 1, further comprising an offset estimator, wherein the offset estimator selects one or more search windows from among the plurality of carrier frequency offset search windows on a basis of the multiple correlation indices, and then estimates a carrier frequency offset of the frequency modulated signal by interpolating a value of the selected search window.

5. The apparatus according to claim 1, further comprising a packet detector determining that packet detection is performed when the multiple correlation indices are equal to or greater than a threshold value.

6. The apparatus according to claim 1, further comprising a symbol timing acquirer extracting a maximum value of the multiple correlation indices and acquiring, when the maximum value extracted is generated, an optimum symbol timing.

7. The apparatus according to claim 1,
wherein the multiple correlation detectors generate the multiple correlation indices by adding the similar amplitude modulated signal to the plurality of carrier frequency offset search windows and then comparing the adding result with the access address.

8. A method of receiving a Bluetooth signal using multiple correlation detections, the method comprising:
receiving a frequency modulated signal;
converting the frequency modulated signal into a similar amplitude modulated signal which is a frequency proportional signal having a value proportional to frequency of a baseband signal; and
performing a multiple correlations detection step to generate multiple correlation indices from the similar amplitude modulated signal, on a basis of an access address received from a link layer and a plurality of carrier frequency offset search windows,
wherein a packet detection, a symbol timing acquisition, and a carrier frequency offset estimation for the frequency modulated signal are simultaneously performed in parallel, on a basis of the multiple correlation indices.

9. The method according to claim 8,
wherein the multiple correlation indices are detected in a reception interval of the access address.

10. The method according to claim 8,
wherein the multiple correlation indices are configured with a plurality of access address correlations generated for each of the plurality of carrier frequency offset search windows.

11. The method according to claim 8, further comprising:
selecting one or more search windows from among the plurality of carrier frequency offset search windows on a basis of the multiple correlation indices, and then estimating a carrier frequency offset of the frequency modulated signal by interpolating a value of the selected search window.

12. The method according to claim 8, further comprising:
determining that packet detection is performed when the multiple correlation indices are equal to or greater than a threshold value.

13. The method according to claim 8, further comprising:
a symbol timing acquiring step extracting a maximum value of the multiple correlation indices and acquiring, when the maximum value extracted is generated, an optimum symbol timing.

14. The method according to claim 8,
wherein the performing of the multiple correlations detection step generates the multiple correlation indices by adding the similar amplitude modulated signal to the plurality of carrier frequency offset search windows and then comparing the adding result with the access address.

* * * * *